United States Patent [19]

Otani et al.

[11] Patent Number: 4,727,435
[45] Date of Patent: Feb. 23, 1988

[54] IMAGE INFORMATION PROCESSING SYSTEM

[75] Inventors: Masatoshi Otani; Kenzoh Ina; Kenichi Mishima, all of Yokohama, Japan

[73] Assignee: Canon Kabushiki Kaisha, Tokyo, Japan

[21] Appl. No.: 776,979

[22] Filed: Sep. 17, 1985

[30] Foreign Application Priority Data

| Sep. 21, 1984 | [JP] | Japan | 59-196575 |
| Sep. 28, 1984 | [JP] | Japan | 59-202008 |
| Sep. 28, 1984 | [JP] | Japan | 59-202009 |
| Sep. 28, 1984 | [JP] | Japan | 59-202014 |
| Sep. 28, 1984 | [JP] | Japan | 59-202015 |

[51] Int. Cl.⁴ .................. H04N 1/00; H04N 1/21; H04N 1/23; H04N 1/46
[52] U.S. Cl. ...................... 358/296; 358/78; 358/256; 358/257
[58] Field of Search ............ 358/296, 298, 300, 256, 358/257, 258, 78

[56] References Cited

U.S. PATENT DOCUMENTS

| 4,110,794 | 8/1978 | Lester et al. | 358/256 |
| 4,291,339 | 9/1981 | Ogawa et al. | 358/260 |
| 4,439,790 | 3/1984 | Yoshida | 358/296 X |
| 4,490,746 | 12/1984 | Moriguchi | 358/257 X |
| 4,527,885 | 7/1985 | Ayata et al. | 358/256 X |

FOREIGN PATENT DOCUMENTS 0130018 1/1985 Japan.
0053469 6/1985 Japan.

*Primary Examiner*—E. A. Goldberg
*Assistant Examiner*—Patrick W. Foster
*Attorney, Agent, or Firm*—Fitzpatrick, Cella, Harper & Scinto

[57] ABSTRACT

An image information processing system has a reader for reading an original image and generating image data, a recorder for recording an image in accordance with image data; a receiving unit for receiving image data from an external apparatus, and a storage unit for storing image data. In the system, during recording of the image by the recorder based on the image data generated by the reader, the image data received by the receiving unit is transferred via a bus line to be stored in the storage unit.

26 Claims, 15 Drawing Figures

IMAGE INFORMATION PROCESSING SYSTEM

BACKGROUND OF THE INVENTION

1. Field of the Invention

The present invention relates to an image information processing system, and more particularly to an image information processing system provided with an I/O unit, image memory and control unit for image information and being capable of transmitting or receiving the image information to or from another system as well as independently operating the I/O unit.

2. Description of the Prior Art

An image information processing system is greatly needed nowadays in the field of office automation, to process image information such as pictures, diagrams or photographs in a manner similar to that of document processing, and such as can interchange the image information between other systems by way of communication networks and so on. Such image information processing systems are now available in the market.

With the apparatus of this type, an original is set on an input device such as an image scanner for inputting the image information. The input device then reads the image information of the original, compresses the read-out image information to a proper size, and transmits the compressed image information and original size information (i.e., image information capacity) to another apparatus.

The apparatus receives data and selects, in accordance with the original size information, a paper sheet of a designated size from recording papers set in the output device such as a laser beam printer for outputting the image information. The apparatus then expands, if necessary, the received image information to print it out.

The above functions except transmission control are quite the same as those of the conventional copying machine. Therefore, the apparatus can be used as a copier while on-line processing is not being performed. Thus, the apparatus can be used very efficiently. In view of this, some apparatuses have been constructed so that they may be used as copiers while on-line processing is not being performed.

The apparatus of the above type, however, cannot perform on-line processing while it is being used as a copier, so that image information from another apparatus, even as small as one page information output, can not be received until the end of the off-line processing. Alternatively, the other apparatus can not transmit image information until the end of the off-line processing at a receiving side. Thus, it is very inefficient and inconvenient.

Furthermore, during the execution of on-line processing, e.g., during the transmission of image information, the apparatus can not perform off-line processing, even as small as one page copying, until the end of the on-line processing, which is extremely inconvenient.

SUMMARY OF THE INVENTION

The present invention has been made in view of the above problems, and it is an object of the present invention to provide an image information processing system which can efficiently deal with various image processing requirements.

It is another object of the present invention to provide an image information processing system which, even during image processing in a one mode, can deal with image processing in another mode by employing a certain processing function operable during the processing in the one mode.

It is still another object of the present invention to provide an image information processing system which, upon occurrence of an image processing demand to change from one mode to another mode, retains the demand and can automatically switch to the other mode after the end of the currently running operation or at a suitable timing during the operation.

The above objects and other objects as well as advantageous operation and effect of the present invention will become apparent from the following description.

DETAILED DESCRIPTION OF THE PREFERRED EMBODIMENTS

The preferred embodiments of the present invention will be described with reference to the drawings.

Figure 1:
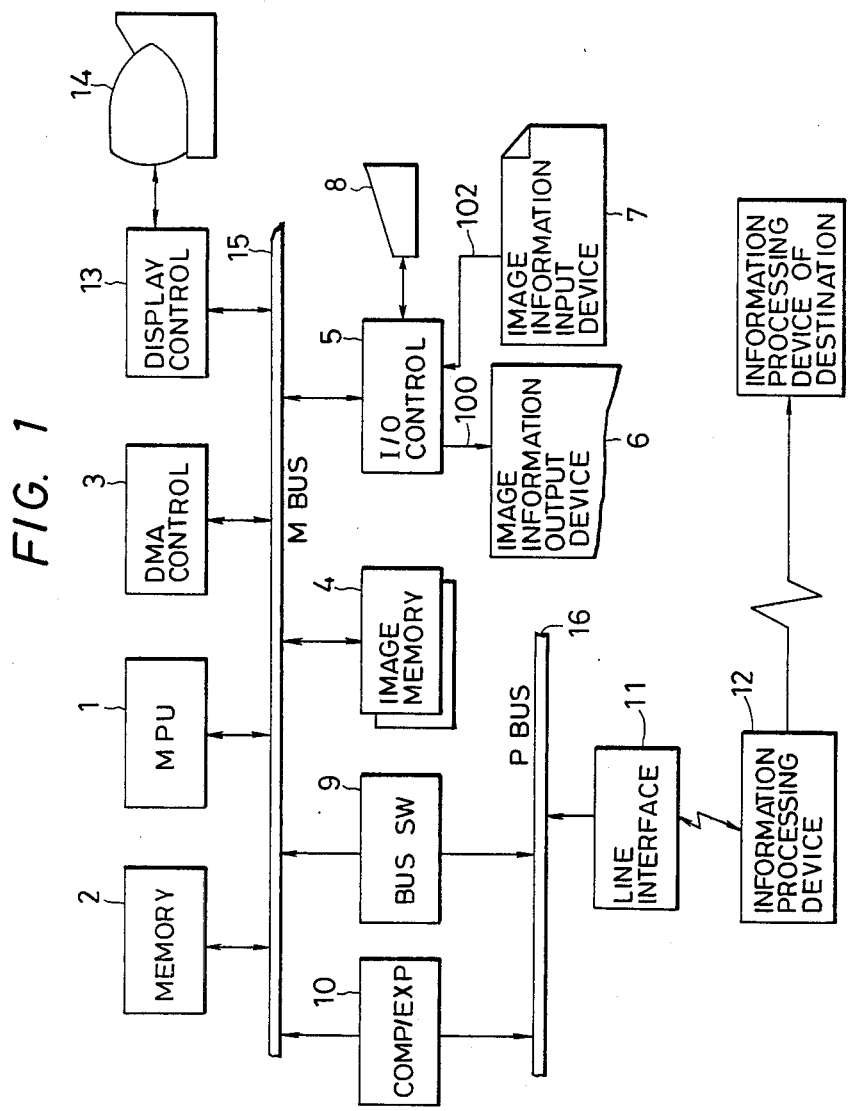
FIG. 1 a block diagram showing an embodiment of the image information processing system according to the present invention.

FIG. 1 is a block diagram showing an embodiment of the image information processing system according to the present invention. In FIG. 1, a control unit (MPU) 1 having a microcomputer as its main element serves to control the entire system of this embodiment. A memory 2 stores a control sequence and the like for the operation of MPU 1 and information to be controlled. A DMA control unit 3 performs a direct-memory-access control between I/O devices and the memory 2 or image memory 4. The image memory 4 can store at least one frame of input/output image information respectively from an image information output device 6 or an image information input device 7. An input/output control unit 5 controls the image information input and output devices 7 and 6. The input/output control unit 5 can operate independently (or in an off-line mode) to perform a copy processing of an original, using the image information output and input devices 6 and 7. A keyboard unit 8 is provided for access by the operator to instruct such operation.

A bus switch 9 switches signals between a P (peripheral) bus 16 and a M (main) bus 15. A compression/expansion unit 10 compresses or expands image information using, e.g., MH or MMR processing. Numeral 11 represents a line interface and numeral 12 represents an information processing device. Two routes are possible between the P bus 16 and M bus 15: by one route, data is received via the compression/expansion unit 10 at which data is compressed or expanded. By the other route, data per se is directly received via the bus switch 9. The image memory 4 is coupled to the M bus 15. In addition, an optional display control device 13 and input/output device 14 such as CRT and keyboard may be connected to the system.

Figure 2:
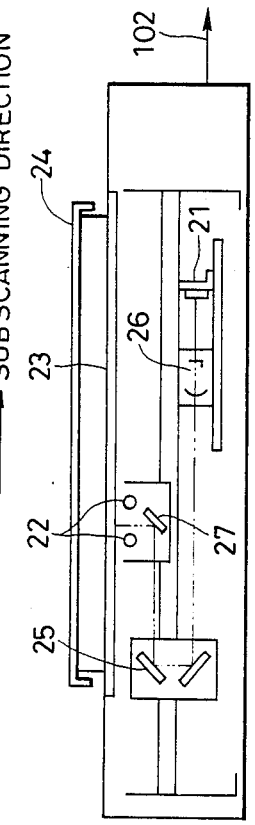
FIG. 2 is a schematic view showing the construction of an image information input device.

The construction of the image information input device (reader) 7 is shown in FIG. 2.

In FIG. 2, an original is placed on an original glass 23 by turning the printed side of the original down, the reference position for placing the original being set at the left side innermost as seen from the front side. The original is held in place upon the original glass 23 by the original cover 24, with the image side to be read turning down. The original is irradiated using a fluorescent lamp 22 and light reflected from it is converged through an optical path defined by mirrors 25, 27, and a lens 26, on the surface of a CCD 21 (image sensor) having a plurality of light reception elements disposed in array. The mirrors 27 and 25 are so arranged to move at relative speeds having a ratio of 2:1. The above optical unit moves or sub-scans from the left to the right at a constant speed under control of a PLL. The resolution power in the sub-scan direction is 16 lines/mm.

The main scan width along the main scan direction takes the maximum width of 257 mm which corresponds to the shorter length of B4 size. To resolve at 16 pel/mm, the number of bits for the CCD requires 4112 (=257×16). Therefore, in the present apparatus, a CCD array sensor having about 5000 bit light reception elements is used for the readout operation.

The image of an original placed on the original glass 23 is then read out sequentially one line after another to generate a 6 bit digital image signal representative of the light and shade of the image. The digital image signal is converted into a binary image readout signal VR at a binary coding circuit to send it to the input/output control unit 5 through a line 102, and to the image memory 4 or the image information output device 7.

Figure 3:
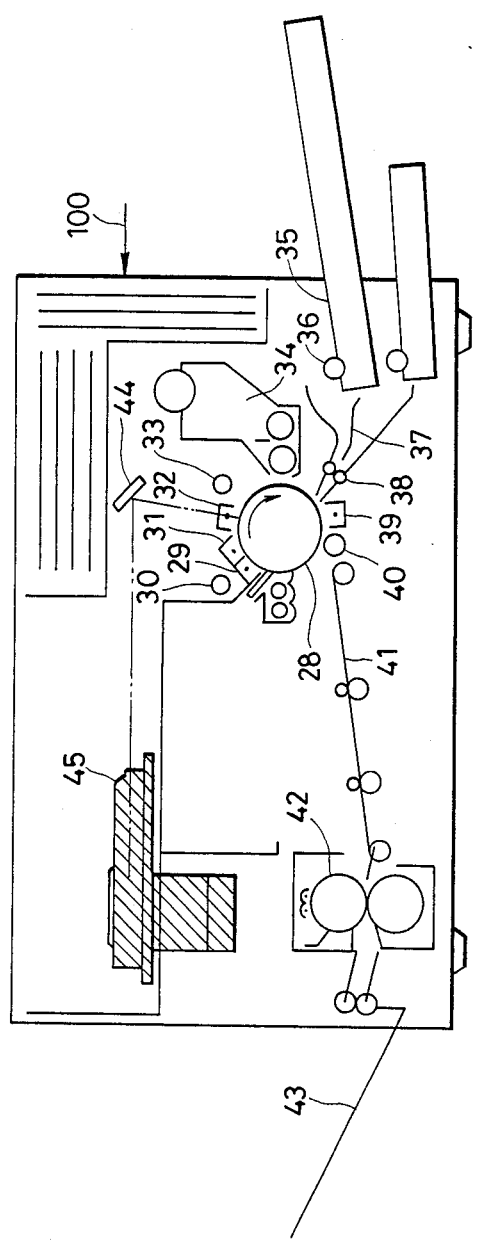
FIG. 3 is a schematic view showing the construction of an image information output device.

FIG. 3 shows the construction of the image information output device (printer) 6. An image signal VP sent in a bit serial form via a line 100 is inputted to a laser scan optical system unit 45 of the printer. The unit 45 comprises a semiconductor laser, collimator lens, rotary polyhedral mirror Fθ lens, and fall compensation optical system. In case the printer 6 is directly coupled to the reader 7, the image readout signal VR (=VP) from the reader 7 is applied to the semiconductor laser and subjected to electro-optical conversion. Laser rays outputted from the semiconductor laser are transformed into parallel rays through the collimator lens and projected upon the rotary polyhedral mirror rotating at a high speed. The laser rays are then scanned on a photosensitive body 28 to form a latent image. The photosensitive body 28 comprises, for example; three layers: electrically conductive layer-photosensitive layer-insulation layer. Process components for enabling image formation are disposed in association with the photosensitive body 28. That is, numeral 29 represents a pre-discharger, 30 represents a pre-discharge lamp, 31 represents a primary charger, 32 represents a seccondary charger, 33 represents a front exposure lamp, 34 represents a developer for a latent image, 35 represents a paper feed cassette, 36 represents a paper feed roller for feeding transfer papers from the cassette, 37 represents a paper feed guide, 38 represents a resist roller, 39 represents a transfer charger for transferring an image onto a transfer paper, 40 represents a separation roller for separating a transfer paper from the photosensitive body 28, 41 represents a feed guide, 42 represents a fixer, and 43 represents a paper withdrawal tray. With the above arrangement, an image is formed on a transfer paper in accordance with a received image readout signal VR (=VP). It is also noted that the input/output control unit 5 may connect the reader 7 to the image memory 4, or the image memory 4 to the printer 6.

The image information processing system constructed as above can operate in two operation modes, i.e., an on-line mode and an off-line mode. In the on-line mode, image data from another information processing device is received via the information processing device 12. Image recording is performed at the image information output device 6 in accordance with the received image data, or the image data is read out from the image information input device 7 and transferred via the information processing device 12 to another designated information processing device. In the off-line mode, image information is read out from the image information input device 7 under control of the input/output control unit 5. The read-out information per se is transmitted to the image information output device 6 to record the image.

Furthermore, are two control modes are provided, i.e., A-mode and B-mode. In the A-mode, no change is allowed from the on-line mode to the off-line mode or from the off-line mode to the on-line mode, until execretion of the currently executing mode (either on-line mode or off-line mode) is completed. In the B-line mode, while image information is printed out from the image information. output device 6 under the on-line processing or the off-line processing, changes from the on-line mode to the off-line mode or vice versa can be effected upon request at the time of a page break.

The basic operation in the on-line mode will be described in detail below with reference to the on-line control flow chart for the input device shown in FIG. 4 and the on-line control flow chart for the output device shown in FIG. 5.

Figure 4:
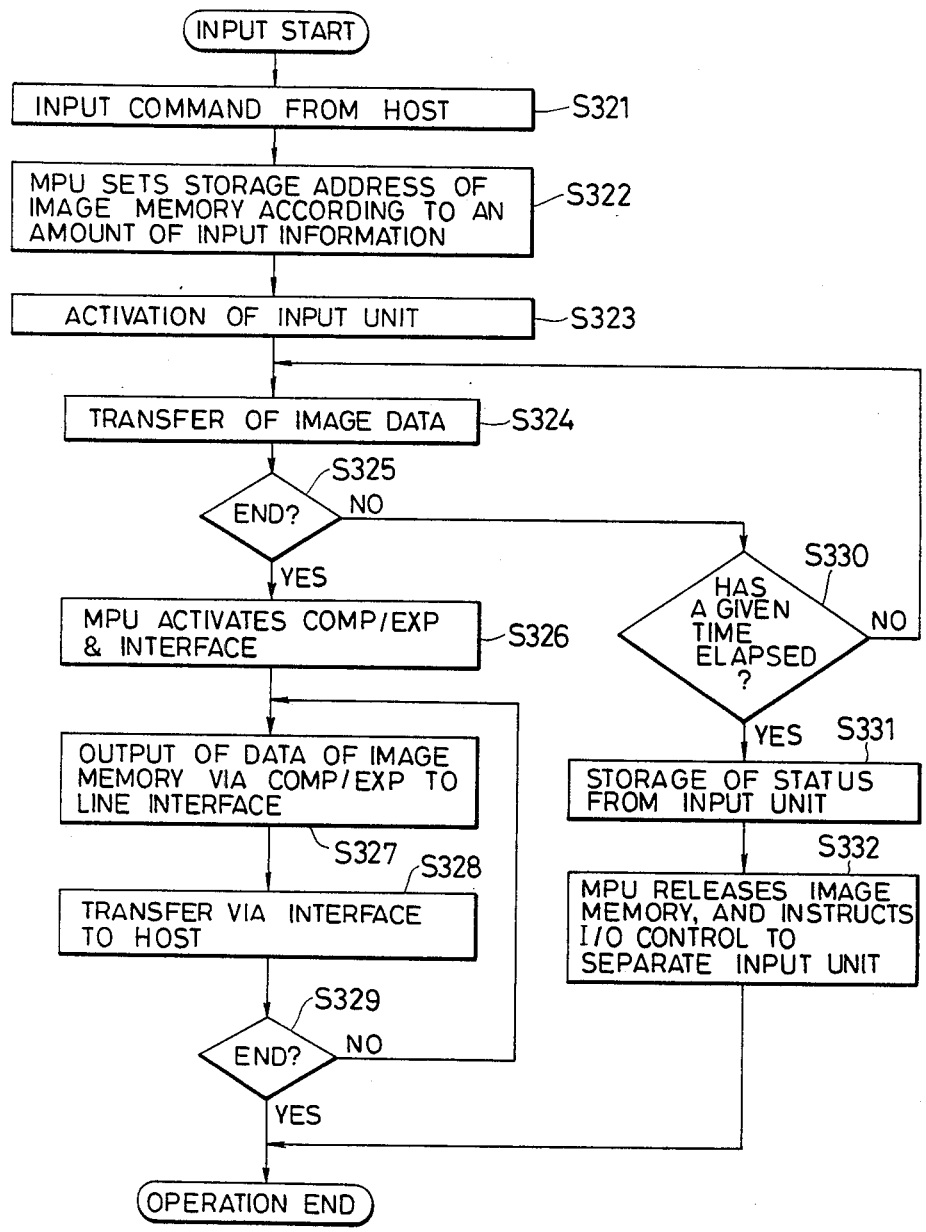
FIG. 4 is an on-line input control flow chart of the embodiment.
Figure 5:
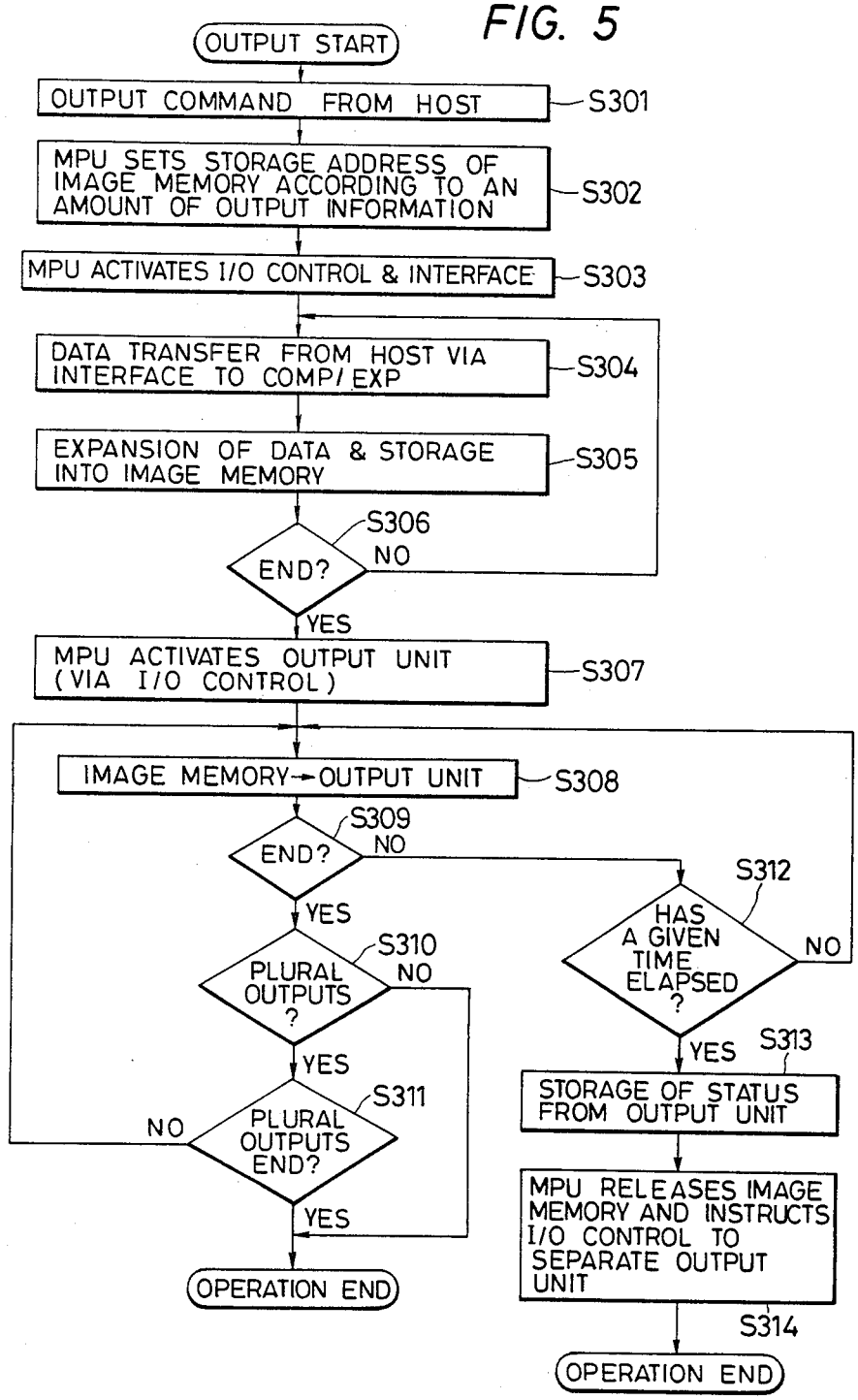
FIG. 5 is an on-line output control flow chart of the embodiment.

Referring now to FIG. 4, how the image information inputted to the image information input device 7 is transferred to the information processing device 12 serving as a host, will be described.

At S321, a command to activate the image information input device 7 is set to MPU 1 from the host information processing device 12. At S323, MPU 1 sets a start (storage) address of the image memory 4 storrng rmage information, based upon the amount of input information (image size). At S323, MPU 1 delivers an activation command t the image information input device 7 through the input/output control unit 5. Next, at S324, the input information (image data) from the image information input device 5 7 is transferred from the input/output control unit 5 to the image memory 4 via M bus 15 to store the input information.

Therefore, at S325 and S330, MPU 1 checks whether the one frame input image information has been completely stored in the image memory or not. If the one frame input image information has been stored in the image memory 4 at S325, then S326 follow where MPU 1 delivers activation commands to the compression/expansion unit 10 and line interface 11. Next, at S327, the information in the image memory 4 is transferred via M bus 15 to the compression/expansion unit 10 to compress the data, which at S328 is transferred via the line interface 7 to the host information processing device 12.

In case the that information compression is unnecessary, for instance, in the case than an expansion function is not provided at the destination device, information is transferred directly to the line interface 11 via the bus switch 9 without passing through the compression/expansion unit 10.

At the host side, transferred information is stored in a magnetic disk or the like, sent over a public network, or transferred to another information 20 processing device over an LAM.

If a given time has elapsed while the transference of image data to the image memory 4 is checked at S325 and S330, then S331 follows S330. This means that some trouble has happened at the image information input device 7 and the transference of image data could not be completed within the given time. At S331, MPU 1 reads status information indicative of the status of the image information input device 7 via the input/output control unit 5 and stores it in the memory 2. At S332, MPU 1 releases the image memory 4 having been allocated for the image information input device 7, and instructs the input/output control unit 5 to separate the image information input device 7 from the on-line state to terminate the operation. In this case, MPU 1 reads and transfers the status information stored in the memory 2 at S331 upon request by the information processing device 12, thereby to display an error notice on an unrepresented display of the host information processing device or on a CRT of the input/output device 14. In FIG. 4, although the processes start upon reception of an input command from the host, an activation command from the console 8 or the like is also possible. Other processings using the memory 4 are enabled at the end of the above operations.

Next, the operation of information transmission from host side to the image information processing system of this embodiment will be described with reference to FIG. 5.

First, at S301, a command to activate the image information output device 6 is sent to MPU 1 from an information processing device 12 at the host side. At S302, MPU 1 sets a start (storage) address of the image memory 4 storing image information, based upon an amount of output information (image size). At S303, MPU 1 delivers activation commands to the compression/expansion unit 10 and line interface 11 via the input/output control unit 5. Next, at S304, compressed image information is transferred from the host information processing device 12 to the compression/expansion unit 10 via the line interface 11. At S305, the transferred image information is expanded at the compression/expansion unit 10, and then stored in the image memory 4 via M bus 15. At S306, whether all of the image information has been transferred or not is checked. If not, the process resumes S304 and continues data transference. If one frame data transference is completed, S307 follows.

In the case that non-compressdd information is received, the information is transferred directly to the image memory via the bus switch 9 without passing through the compression/expansion unit 10.

At S307, MPU 1 delivers an activation command to the image information output deVice 6 via the input/output control unit 5. At S308, the image information is sent from the image memory 4 to the input/output control unit 5 via M bus 15 and transferred further to the image information output device 6 to eventually print it out on a paper sheet.

Thereafter, at S309 and S312, it is checked whether the image information stored in the image memory 4 has been completely outputted or not. If not, S308 resumes. Alternatively, if affirmative, S310 follows S309. At S310, whether the designations such as print-out forms and the number of sheets from the host information processing device 12 are plural outputs or not, is checked. If they are not plural outputs, then the processing terminates, to prepare a next processing. If they are plural outputs, S311 follows. At S311, whether the designated number of outputs have been completed or not, is checked. If not, again S308 resumes to continue printing process for the image information stored in the image memory 4 until the designated number of outputs is completed.

As seen from the above, by repeating the data flow processes between the image memory 4, input/output control unit 5 and image information output device 6, a plurality of sheets can be printed out irrespective of a single data transference process from the host.

If a given time has elapsed while the transference of image information to the image information output device 6 is checked at S309 and S312, then S313 follows S312. This means that some trouble such as jamming of sheet has happened at the image information output device 6 and the printout process is being interrupted. At S313, MPU 1 reads status information indicative of the status of the image information input device 6 via the input/output control unit 5 and stores it in the memory 2. At S314, MPU 1 releases the image memory 4 having been allocated for the image information output device 6, and instructs the input/output control unit 5 to separate the image information output device 6 from the on-line state. This status is communicated noticed to the information processing device 12. At this time, other processings using the memory 4 are enabled.

In the foregoing, access to the image memory 4 by the input/output control unit 5 is carried out in accordance with the commands from MPU 1 under direct-memory-access control by using the DMA control unit 3. Therefore, MPU 1 does not concern the control for data transference after it instructs the input/output control unit 5 to operate. The input/ output control unit 5, on the other hands, notifies MPU 1 of the fact that whole image information has been read or written. As a result, MPU 1 functions only to judge the end of image information transference from a notice, received by the input/output control unit 5 and indicative of the end of the input/output process. Thus, as an end signal is received, it is checked (S311) whether the number of sheets designated by the host information processing device 12 has been printed or not. If it is still not completed, again the input/output control unit 5 is instructed to perform the same print-out operation.

In the above processing, it is possible to read status information from the image information output device 6 via the input/output control unit 5 every time an end signal is received, thereby controlling to check the operation status and, if it is normal, output the succeeding print-out instruction. In this connection, S312 checks whether such an end signal for the input/ output process is received within a given time. If there is no end signal within the given time, an abnormal condition of the system is concluded.

As described in the foregoing, even if the image information input or output device stops due to some disorder, the memory 4 can be released at that time and used for other processings. Therefore, an image information processing system can be realized which does not give adverse effect upon other devices.

For instance, it is assumed that data transmission or reception is conducted in an on-line mode over a certain destination and such operation is interrupted by some disorder. In this case, the memory 4 is released at that time, and by using the memory 4 it is possible to conduct in an on-line mode data transmission over another destination.

Furthermore, if the capacity of the memory 4 is so set to enable to store a plurality of frames, the image information at the time of malfunction can be retained at one area of the memory, while a new image information can be stored at another area to conduct image information transference or reception over another destination.

Next, the image processing operation in on-line and off-line mode of the presently embodied system will now be described. In the present system, as discussed previously, there are two operation modes of on-line and off-line modes, and two control modes of A-mode and B-mode.

The operation will be described with reference to the flow charts shown in FIGS. 6(A) to (E).

In the present embodiment, the system automatically holds an on-line mode at an initial state of power-on as shown at S1, and an unrepresented on-line key of light illumination type of the keyboard 8 turns on. The on-line key may be mounted for example at the vicinity of the operation panel of the image information input device 7, in place of the keyboard 8.

At S2, it is checked whether there is any one of on-line requests: one is an on-line operation request or an image data output request which is enabled upon reception of a request to output, from the information processing device 12 to the image information output device 6, image data from another information processing device; and the other is an image data transference request to transfer image data from the image information input device 7 to another designated information processing device. If there is any one of the requests, S20 follows. On the other hands, if there is no on-line operation request, it is checked at S3 whether the on-line key has been activated and a "KEY" flag has been set. If the flag is not set, then S2 resumes. If the flag is set, S5 follows.

It is noted that the set/reset of the "KEY" flag and the set of A-mode/B-mode which will be described later are initiated based upon a mode designation processing routine. In the mode designation processing routine, a depression of the key of the keyboard 8 is detected with the input/output control unit 5 which in turn requests for an interruption routine against MPU 1, thereby interrupting a currently executing processing at MPU 1 to advance to the processing shown in FIG. 6(E).

Figures 1, 6A:
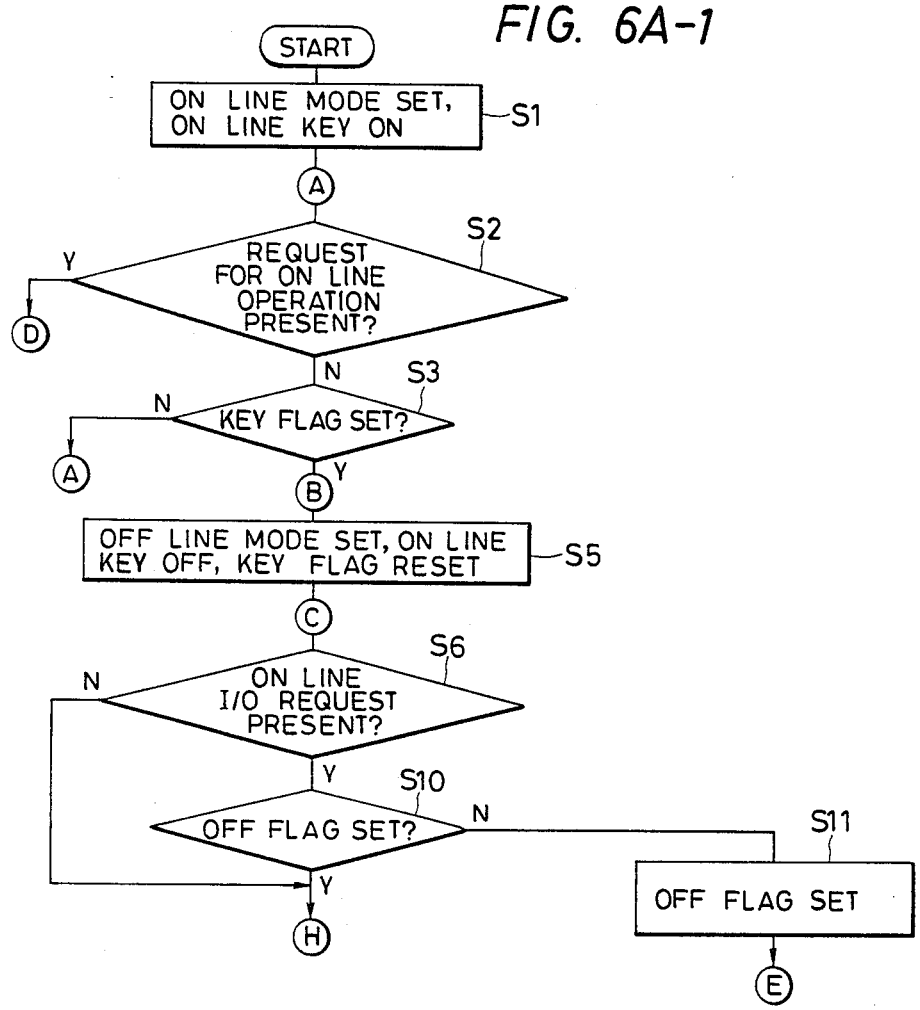
Figures 2, 6A:
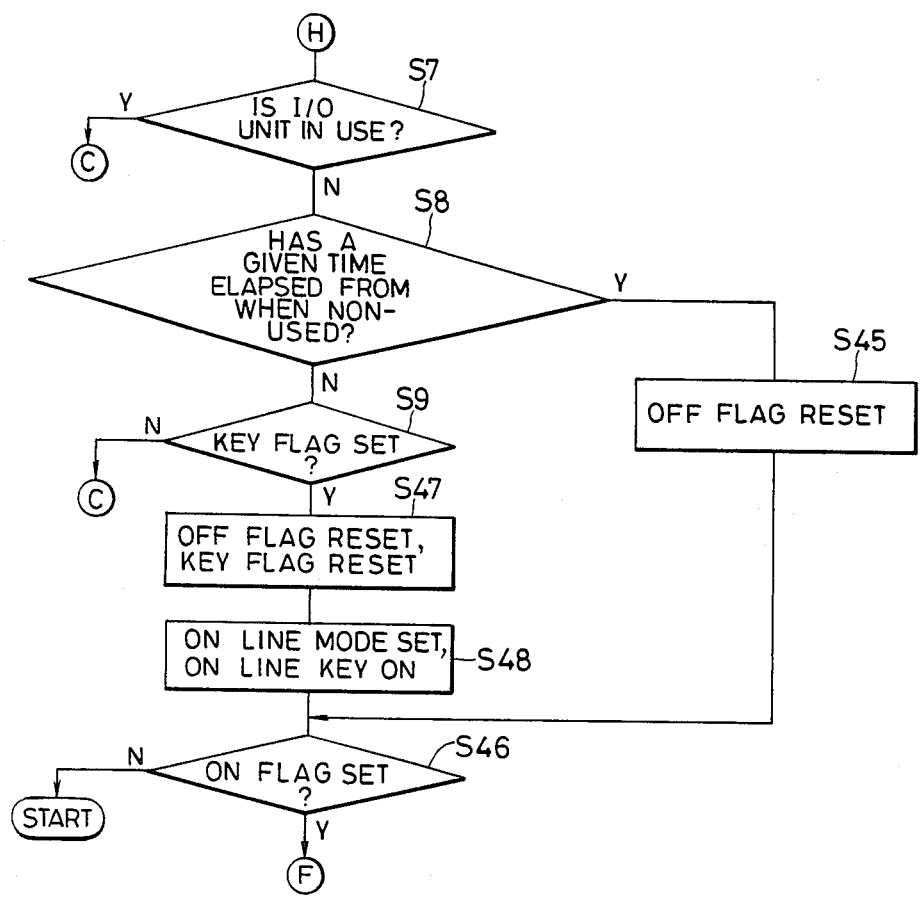
Figure 6B:
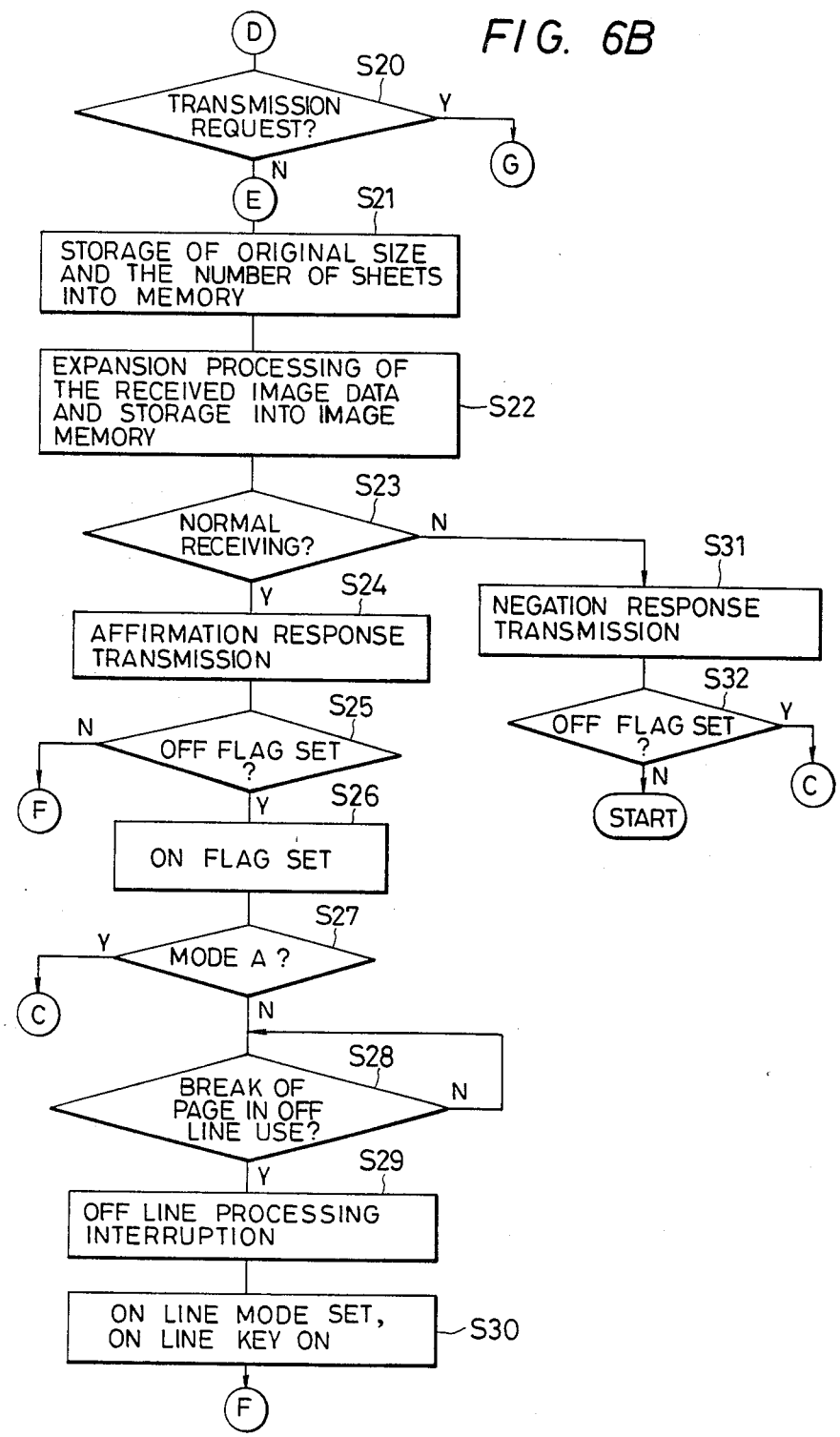
FIGS. 6 (A) to (E) are operation flow charts of the embodiment.
Figure 6C:
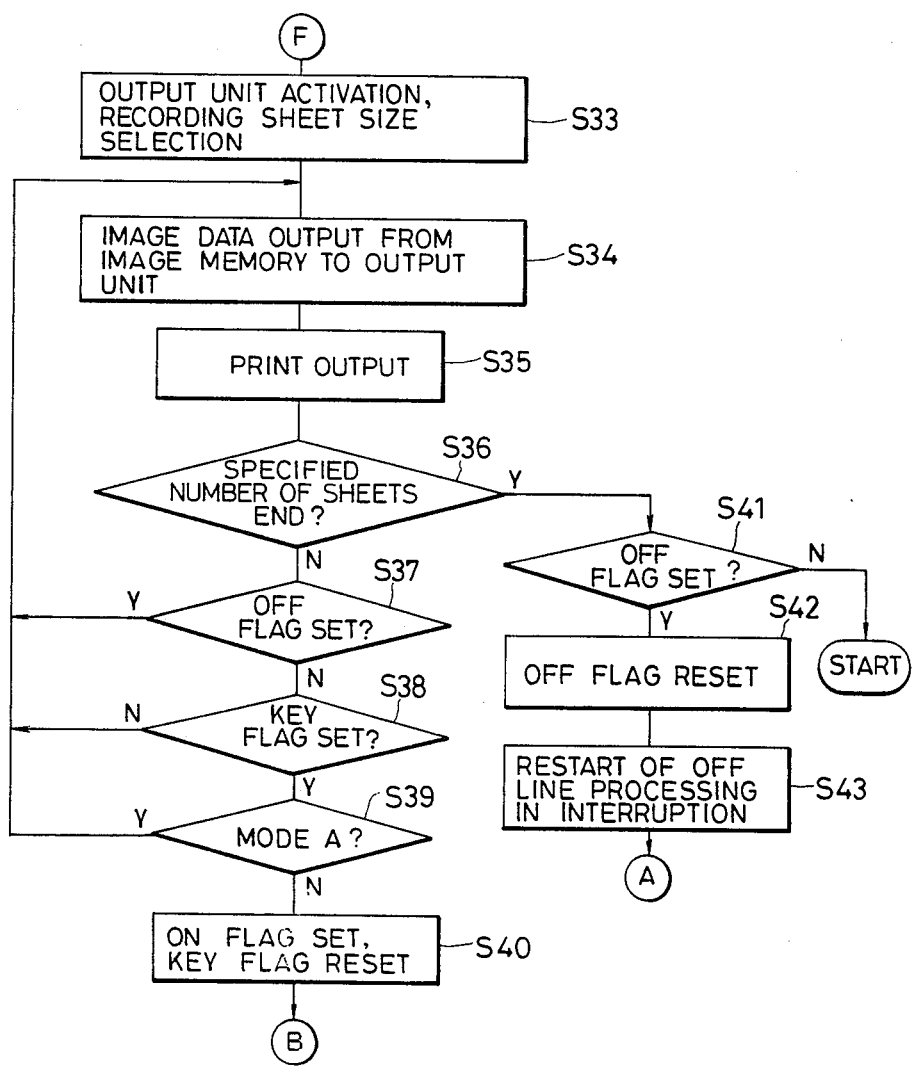
Figure 6D:
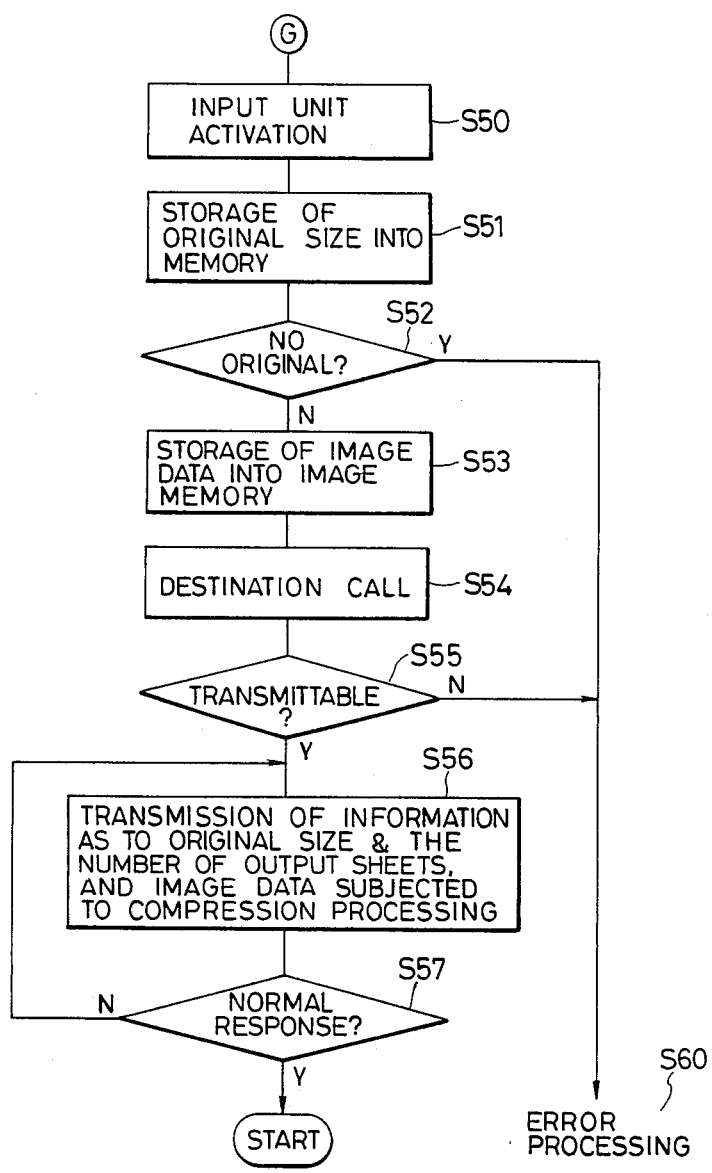
Figure 6E:
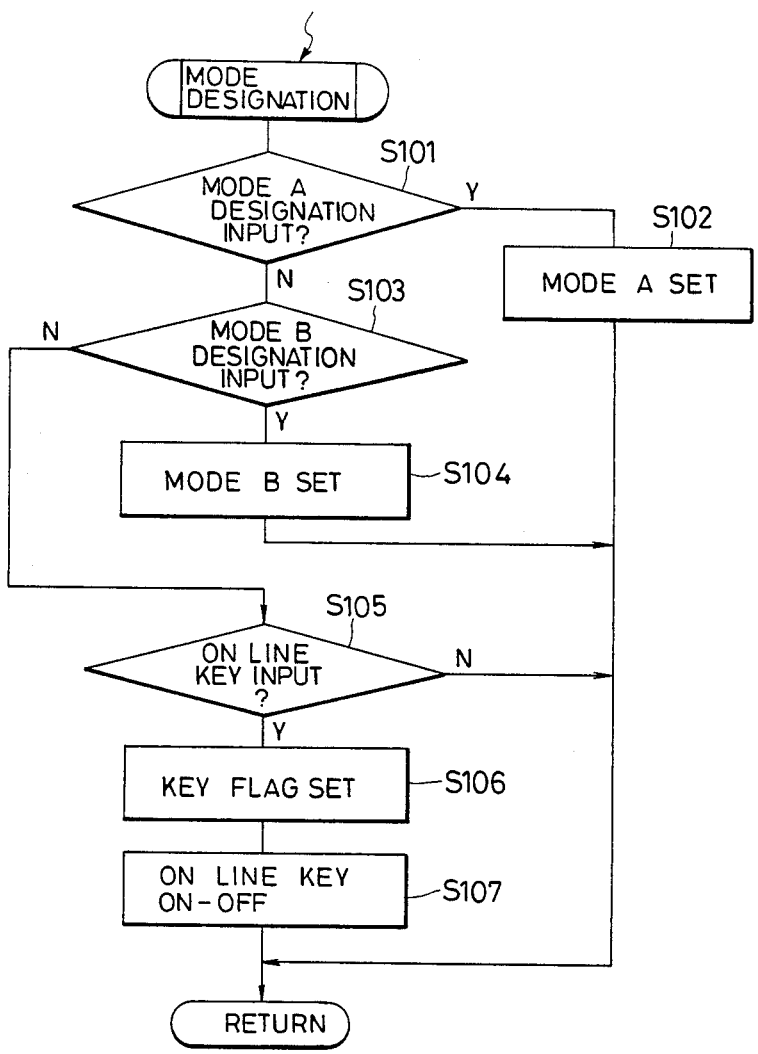
Figure 7A:
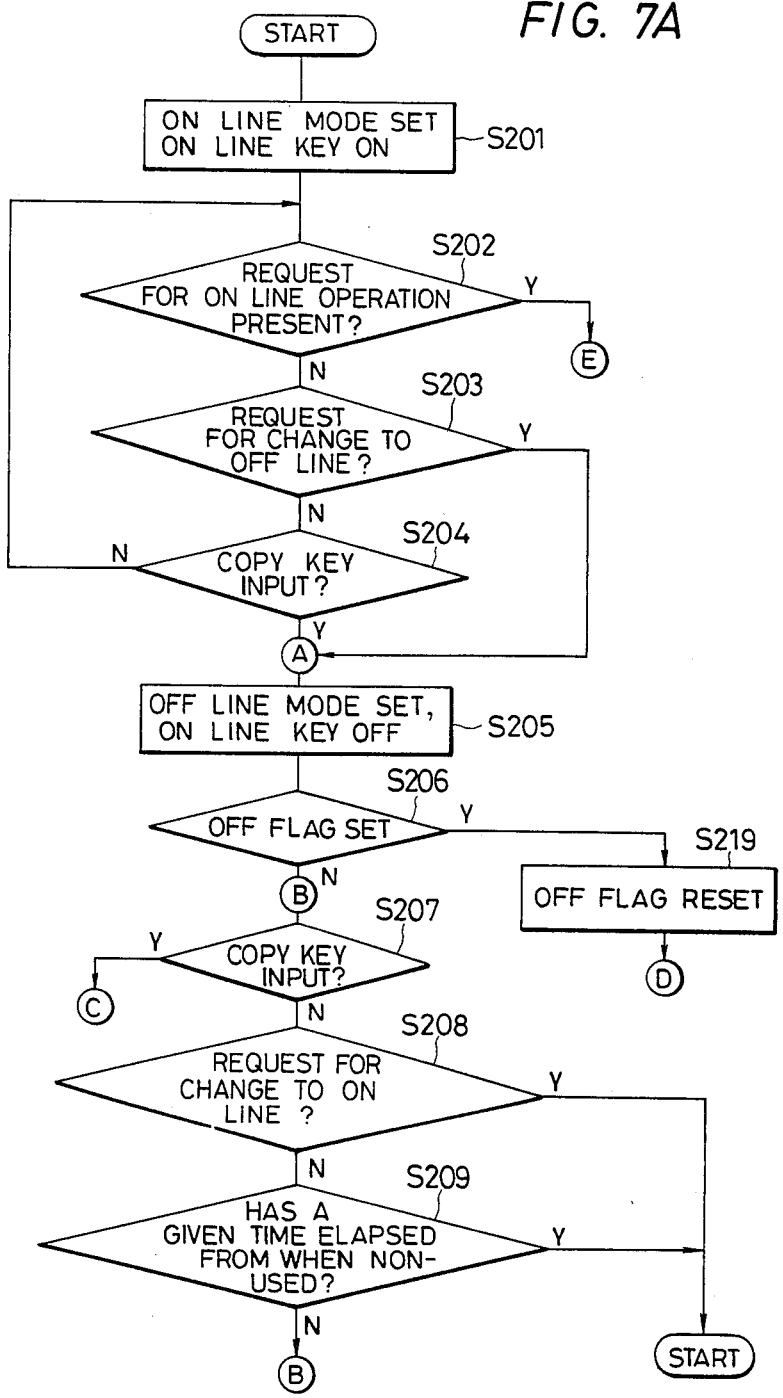
FIGS. 7 (A) to (E) are operation flow charts of another embodiment.
Figure 7B:
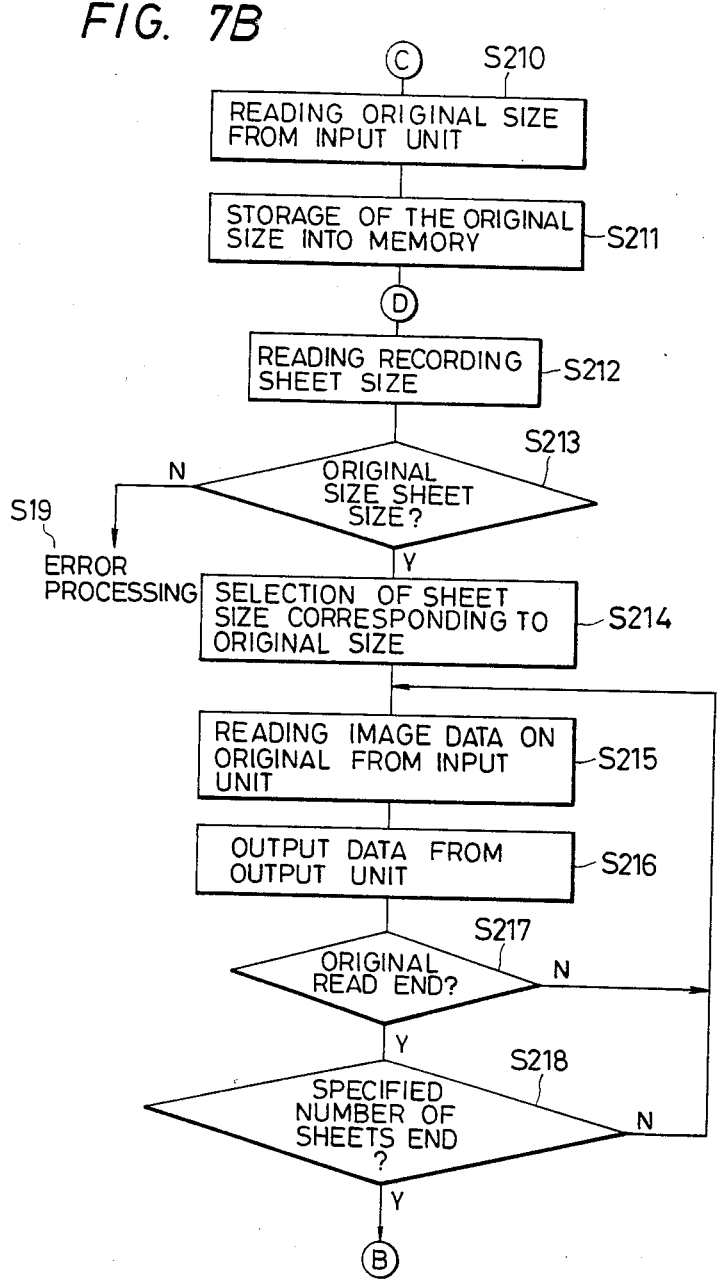
Figure 7C:
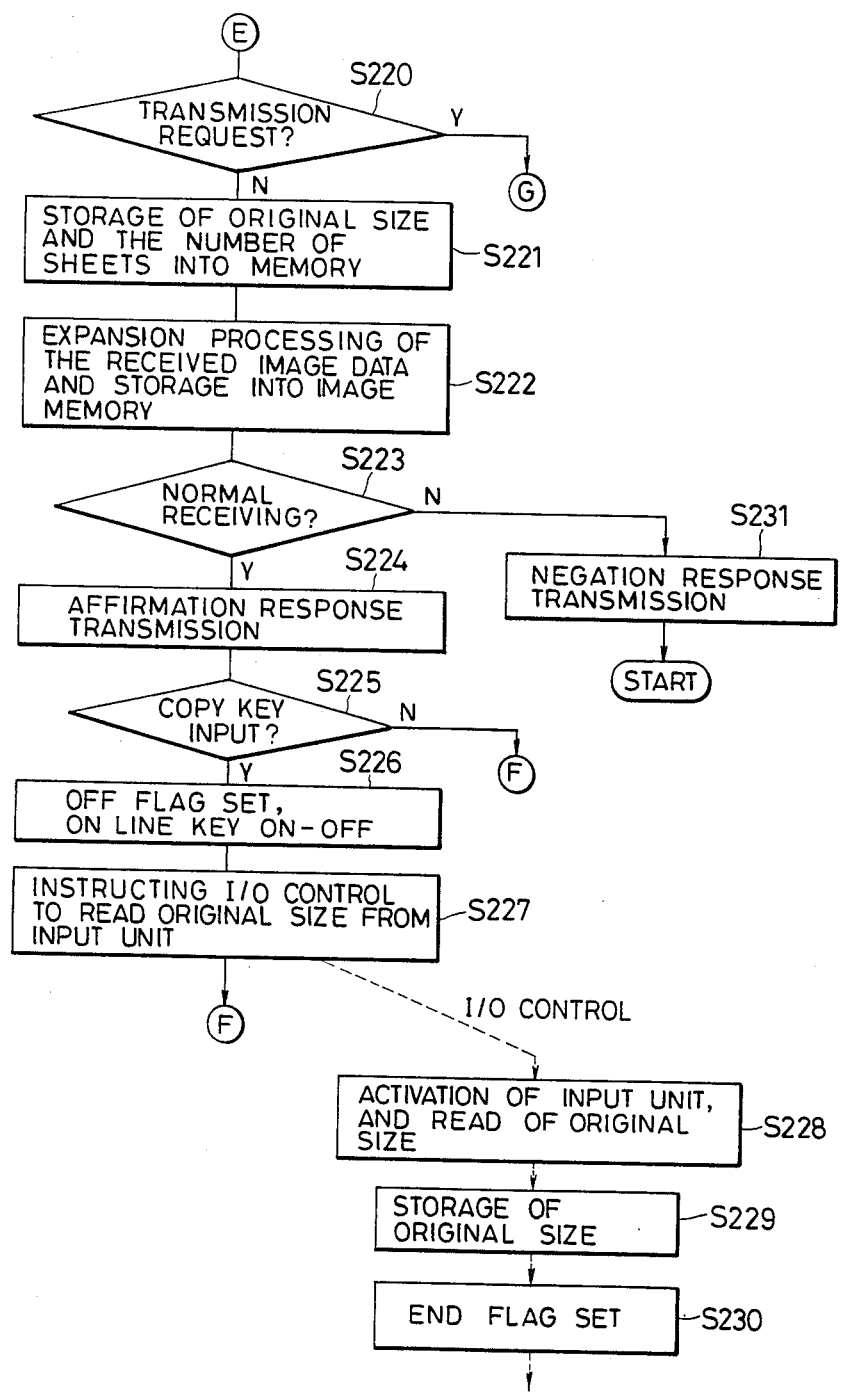
Figure 7D:
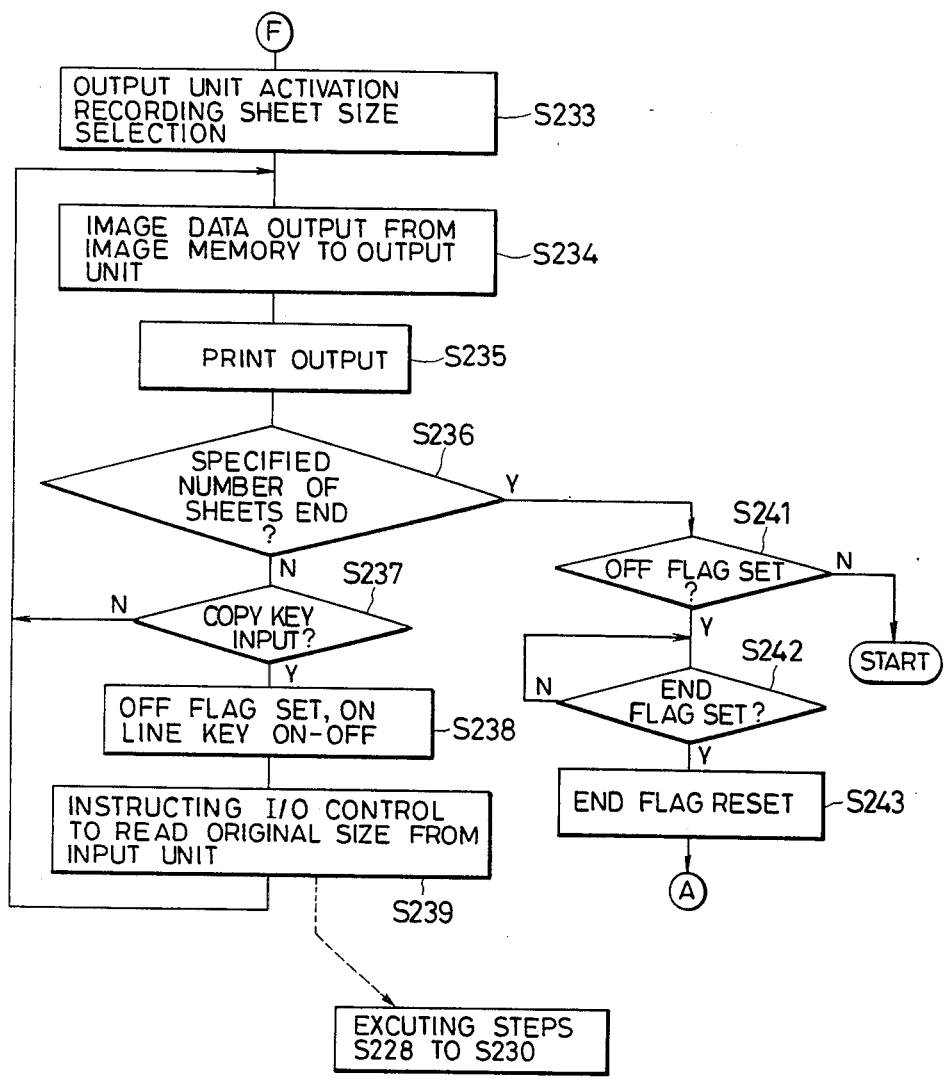
Figure 7E:
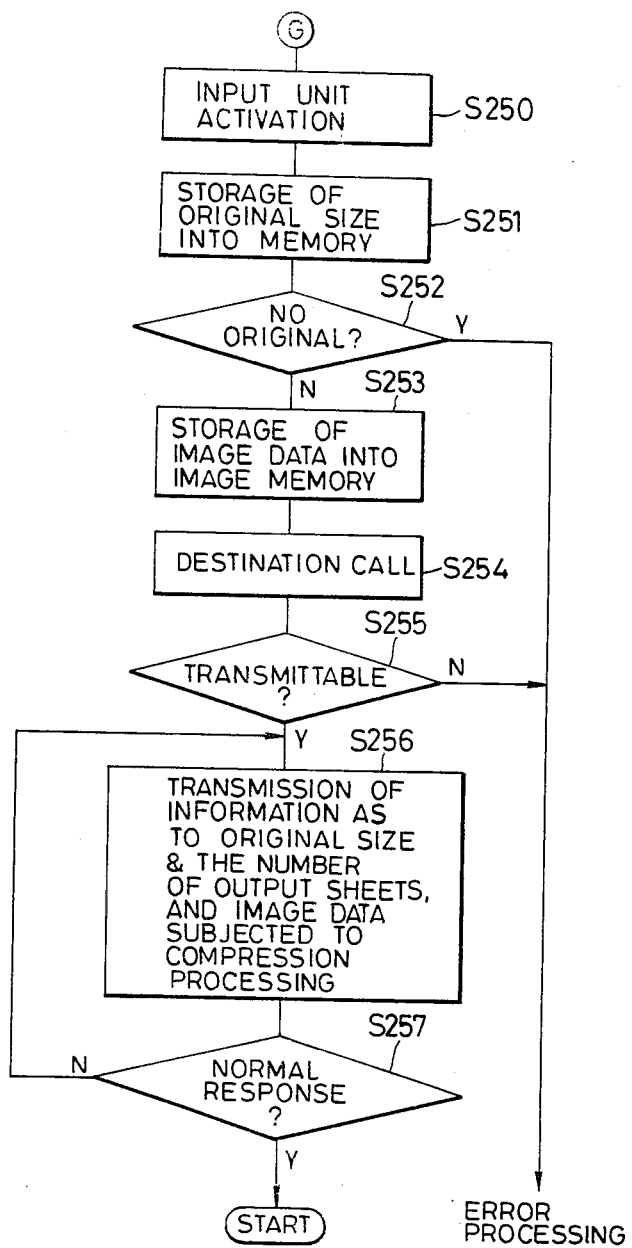

In the mode designation processing routine shown in FIG. 6(E), first at S101, it is checked whether an A-mode designation input is present. In case of an A-mode designation input, the A-mode is set at S102 to return to the original routine. If an A-mode designation input is not present, then it is checked whether a B-mode designation input is present. In case of a B-mode designation, then at S104 the B-mode is set to return to the original routine. If there is no B-mode designation, S105 follows to check the presence of an input from the on-line key. With the input from the on-line key, a "KEY" flag is set at S106 which indicates a presence of a request to change from a current on-line or off-line mode to another mode. Thereafter, at S107, the original routine resumes after the on-line key is made to flash.

In case of the absence of an input from the on line key at S105, the interruption routine returns to the original main routine since there are no other modes in the present embodiment.

Referring back to FIG. 6(A), in case a "KEY" flag is set at S3, it means that there is a request to the flow advances to S5 where an off-line mode is set, the off-line key is turned off, and a "KEY" flag is reset. In this case, a change between on-line/off-line, i.e., a change from an on-line mode to an off-line mode or vice versa, is conducted by actuating the same key (on-line key). Then, after S5, it is checked at S6 whether an on-line input-/output request is present, in a similar manner to S2. If there is no input/output request, S7 follows. At S7 it is checkd whether an actual processing in an off-line mode is under operation, i.e., whether image information is being read from the image information input device 7 under control of the input/output control unit 5 and directly outputted to the image information output device 6 (or in other words, whether the system is now operating as a copier).

If such processing is under operation, the flow returns to S6. On the other hands, if such processing is not under operation, the input/output control unit 5 checks if a given time has elapsed since the input or output device (6,7) becomes non-used. If a given time has not elapsed, a check is made at S9 whether a "KEY" flag is set and the on-line key has been activated. If there is no key input, the flow returns to S6.

During an off-line processing at S6, if there is an on-line output request, i.e., an output request to receive image information from another information processing device at the information processing device 12 now concerned and record the received image information by using the image information output device 6, the flow advances to S10 to check if an "OFF" flag is set. If an "OFF" flag is set, S7 follows. If not, an "OFF" flag is set at S11 to follow S21. The "OFF" flag is a flag indicative of occurrence of an output request in an on-line mode during a off-line processing.

Since the off-line processing is carried out only under control of the input/output control unit 5, MPU 1 can control at S21 the memory 2 and image memory 4 entirely freely and independently from the off-line processing. Consequently, the original size and the number of sheets, sent from another information processing device to the information processing device 12 of now concern, are stored via the line interface 11 and bus switch 9 in the memory 2. Next, at S22 the succeeding transmitted image information is received. The received image information is expanded, if necessary, at the compression/expansion unit 10 to store it in the memory 4. Or if not necessary, the image information is directly stored in the image memory 4 via the bus switch 9.

At S23, whether one frame data has been normally received via the line interface 11 is checked. If it is normal, at S24, an affirmation response is transmitted and thereafter at S25 it is checked whether an "OFF" flag is set. If an off-line processing is not currently under operation and an "OFF" flag is not set, then S33 follows. Alternatively, if an off-line processing is currently under operation and an "OFF" flag is set, then at S26 an "ON" flag is set. The "ON" flag is a flag indicating that since the image information output device 6 currently operates in an off-line mode, data received from another information processing device and to be outputted to the image information output device 6 is now stored in the image memory 4.

At S27, it is checked whether the mode designation is an A-mode. If the mode designation is an A-mode, i.e., a mode wherein image information transmitted in an on-line mode is not outputted until an off-line processing finishes, then the flow returns to S6 to wait for the end of the off-line processing.

If an A-mode is not designated at S27, it is a B-mode, i.e., a mode wherein an off-line processing is automatically switched from an on-line processing at a page break even during an off-line processing (original copying). Therefore, in this case S28 follows to make MPU 1 activate the input/output control unit 5 so that a page break is checked during the copying processing in the current off-line mode. At a page break, the flow advances to S29 after S28 to make the input/output control unit 5 interrupt the off-line processing. Next, at S30, an on-line mode is set, the on-line key is turned on, and S33 follows.

In case image data is not normally received at S23 and some reception error is present, then the flow advances to S31 to transmit a negation response to the information processing device 12 via the line interface 11, the negation response serving as a request to send the image data once again. At S32, it is checked whether an "OFF" flag is set. If it is not set, the flow returns to S1, while on the other hands if it is set, the flow returns to S6.

If S33 is used after S30, image information is outputted from the image information output device 6 at the following steps including S33, the image information having been received in an on-line mode from another information processing device and already stored in the image memory 4.

First at S33, the input/output control unit 5 activates the image information output device 6 under control of MPU 1, and a recording sheet size corresponding to the designated original size is selected. Next at S34, the input/output control unit 5 sequentially reads the image information stored in the image memory 4 to transfer it via M bus 15 to the image information output device 6 and print it out at S35. Thereafter at S36, it is checked whether printing of a designated number of sheets has been completed. If not, the flow advances to S37 to check an "OFF" flag is set or not. If it is set, since it means that a on-line operation is being executed after the interruption of an off-line operation, an on-line mode continues by returning to S34 without setting a new mode. On the other hands, if an "OFF" flag is not set, the flow advances to S38 to check whether a "KEY" flag is set. If a "KEY" flag is set, the flow returns to S34. Alternatively, if not, it is checked at S39 whether the present mode is an A-mode. If it is an A-mode, the flow returns to S34 since there is no change of on-line/off-line until the end of processing. If it is not an A-mode but a B-mode, then S40 follows to set an "ON" flag and reset a "KEY" flag. And at S5, a change to an off-line mode is effected.

As the print-out to the image information output device 6 sequentially progresses and a designated number of sheets is completely printed out, the flow advances to S41 from S36 to check whether an "OFF" flag is set. If not, the flow returns to S1 to wait for a next image information input in an on-line mode.

In case an "OFF" flag is set, it means that an on-line processing has been executed after the interruption of an off-line processing. Therefore, at S42, an "OFF" flag is reset to resume an off-line processing interrupted at S43 and thereafter return to S5.

If the input/output device becomes non-used for a given time at S8 during an off-line processing, then the flow advances to S45 from S8. If an "OFF" flag is set at S45, the flag is reset and thereafter at S46 it is checked whether an "ON" flag is set. If it is set, data to be outputted is stored in the image memory 4 and a print-out processing is executed at S33 since the system is waiting for the output to the image information output device 6 in an on-line processing. If an "ON" flag is not set at S46, then the flow returns to S1 to automatically change to an on-line mode.

Reverting back to S9, if a "KEY" flag is set, i.e., if there is a request to switch from an off-line mode to an on-line mode, the flow advances to S47 from S9. If an "OFF" flag is set at S47, then the flag is reset and the "KEY" flag is also reset. At S48, a change from an off-line mode to an on-line mode is effected to turn on the on-line key and advance to S46.

If S20 follows upon request for an input/output in an on-line mode at S2, it is checked whether the request is a transmission request, i.e., a request to read an original set on the image information input device 7 and transmit the read-out original to another information processing device. If the request is not a transmission request but an output request to the image information output device 6, then the flow advances to S21. If it is a transmission request, then the flow advances to S50.

At S50, MPU 1 activates the image information input device 7 via the input/output control unit 5. At S51, the original size of an original set on the original reading surface of the device 7 is read and the read-out size data is stored in the memory 2. Next, at S52, it is checked whether an original has been placed on the reading surface. If an original is not placed on the surface, an error processing at S60 is carried out to conduct a procedure such as instructing the operator to place an original.

If it is confirmed that an original has been placed, the flow advances to S53 from S52. At S53, the image information input device 7 reads image information from the original and sequentially stores it in the image memory 4. Upon completion of the storage, the flow advances to S54. At S54 to call a destination information processing device to which image information is to be transmitted, the information processing device 12 is notified of the fact that image information transmission has been fully prepared. Next, at S55, a response from the information processing device 12 is received to check the response as to transmittability of the device. If it is not transmittable to the destination information processing device, an error processing at S60 is carried out to thereby notify the operator of an untransmittable state.

In case of a transmittable state at S55, information on an original size and the designated number of sheets are first read out from the memory 2. Then, the read-out information is transferred to the information processing device 12 via the bus switch 9 and line interface 11. Succeedingly, the image information previously read at S53 is read out from the image memory 4, subjected to a compression processing at the compression/expansion unit 10, and transferred to the information processing device 12 via the line interface 11. Thereafter, it is checked whether the image information has been normally transferred and an affirmation response has been given. In case of an affirmation response, the transmission processing is terminated to return to S1. In case of a negation response and if a transmission is requested once again, then the flow returns to S56 to again transmit image information and other necessary information.

According to the embodiment described above, even during an off-line copying processing similar to that with an independent, general copier, it is possible, upon reception of a print-out request from the image information processing device 12 in association with another information processing device, to receive image output information without interrupting the copying processing, conduct an expansion processing if necessary at the compression/expansion unit 10, and store it in the memory 2 and image memory 4. Therefore, after completion of the off-line processing or during an idle time of the image information output device 6, information as to the original size, the number of sheets and image information are immediately read out from the memory 2 and image memory 4 to output them to the image information output device.

Furthermore, particular processing modes (A-mode, B-mode) are possible. In the A-mode, no change from an on-line mode to an off-line mode or vice versa is not enabled until a presently executing mode (on-line mode or off-line mode) is completed. However, in this case, an input of an off-line request (copying request) is held and the on-line key flashes to thereby notify the operator of such effect. Such request has been ignored heretofore, but in the present embodiment a processing conforming with such request is realized after completion of the on-line processing. Also, in case the input/output device (6,7) is not used for a given time in an off-line mode, an on-line mode is automatically effected.

In contrast with the A-mode, if a B-mode is set, while image information is printed out by the image information output device 6 either in an on-line processing or off-line processing, a change from an on-line mode to an off-line mode or vice versa is possible at a page break to execute the changed processing.

As seen from the foregoing, even while image information inputted by an input means in an off-line mode is outputted to an output means, an output information from another system to the output means can be received and stored in a storage means and the stored information in the storage means can be outputted to the output means immediately after completion of the off-line processing. Thus, an image information processing system can be presented which has a short wait time in transmission and is very efficient.

Furthermore, a request for processing in an off-line mode can be inputted during an on-line processing. The inputted request for processing is retained and such processing conforming with the processing request is automatically executed after completion of the on-line processing. Therefore, an image information processing system can be presented which is unnecessary to always check the end of the on-line processing and also input a change to an off-line processing after the end of the on-line processing.

As is apparent from the foregoing description, during an operation, for example, recording in an on-line mode an image by using the image information output device 6 based upon the image data received from another information processing device and stored in the memory 2, it is impossible to output the image data by using the image information input device 7.

However, an original setting on the original glass 23 of the image information input device 7 or an input of processing conditions for the set original is possible. So, such preliminary processings are carried out prior to the end of the currently executing processing, thereby enabling to start the next processing, operation immediately thereafter.

An example of the construction enabling the input of processing conditions or the like during a disabled period for outputting image data will be described hereinafter. In the following construction, the image processing system arrangement is the same as with FIGS. 1 to 3 and a control sequence to be executed by MPU 1 is somewhat modified as shown in FIG. 7 from that in FIG. 6.

The operation of the other embodiment will be described with reference to the flow charts shown in FIGS. 7(A) to (E).

In the present embodiment, the system automatically holds an on-line mode at an initial state of power-on as shown at S201, and an unrepresented on-line key of light illumination type of the keyboard 8 turns on. The on-line key may be mounted for example at the vicinity of the operation panel of the image information input device 7, in place of the keyboard 8.

At S202, it is checked whether there is any one of on-line requests: one is an on-line operation request or an image data output request which is enabled upon reception of a request to output, from the information processing device 12 to the image information output device 6, image data from another information processing device; and the other is an image data transference request to transfer image data from the image information input device 7 to another designated information processing device. If there is any one of the requests, S220 follows. On the other hands, if there is no on-line operation request, it is checked at S203 whether the on-line key has been activated to request a change to an off-line processing mode. If there is no change request, the flow returns to S204, while if there is a change request, the flow advances to S205. It is checked at S204 whether an unrepresented "copy" key mounted on the operation panel of the image information input device 7 has been activated. In case of the absence of the "copy" key input, the flow returns to S202. In case of the presence of the input, then the flow advances to S205.

At S205, an on-line mode is changed to set an off-line mode and the on-line key is turned off. The change between on-line/off-line is cyclically effected by activating the same key (on-line key). The flow advances from S205 to S206, where it is checked whether an "OFF" flag is set. If the flag is not set, it is checked at S207, as similar to S204, whether the unrepresented "copy" key mounted on the operation panel of the image information input device 7 has been depressed. If there is a "copy" key input, such as in the case that the flow advances to S205 due to the presence of a "copy" key input at S204, then the flow advances to S210. In case of the absence of a "copy" key input, the flow advances from S207 to S208, where it is checked whether there is a change request from an off-line processing to an on-line processing, caused by the on-line key input. If there is a change request, the flow returns to S201 to effect an on-line processing mode.

If there is no request, then at S209 the input/output control unit 5 checks whether the input/output device (6,7) keeps non-used for a given time. In non-used case for a given time, the flow returns to S201 to automatically set an on-line processing mode. If a given time has not elapsed from a non-used state, the flow returns to S207 to wait for an input from the "copy" key or on-line key.

In case there is a "copy" key input at S207, the flow advances to S210, where the input/output control unit 5 activates the image information input device 7 to read the size of an original placed on the original glass 23 of the device 7. The readout processing is performed in the following manner: The original is irradiated with the fluorescent lamp 22, and the reflected light is detected with the CCD 21 via the mirrors 25, 27 and lens 26. This optical unit is scanned in the arrow direction shown in FIG. 2 to detect a number of edges of the original so that in this case image information on the original is not read out.

The original size read at S210 as above is written in a predetermined area of the memory 2 under DMA control at S211. Then, S212 follows where the input/output control unit 5 reads the size of recording sheets set in the image information output device 6. Next at S213, it is checked whether there is a coincidence between the original size read at S210 and the size of recording sheets set in the image information output device 6. If there is no coincidence, an error processing at S219 is executed to make the operator prepare and select proper recording sheets.

If an "OFF" flag is set at S206 which means that processings corresponding to S210 and S211 are completed during the on-line processing, an "OFF" flag is reset at S219 to advance to S212.

If there is a coincidence of size at S213, coincidental recording sheets are select at S214. At S215, the image information input device 7 is activated to move the optical unit (22, 25, 27) in the sub-scan direction, read image information on the original with the CCD 21, and transfer it to the input/output control unit 5. The input/output control unit 5, which has received the read-out data, outputs it to the image information output device 6 at S216 to print it out on the recording sheet. The image information output device 6 is a laser beam printer shown in FIG. 3 and is constructed such that digitalized image information signals modulate the laser to emit a light beam which is used to form a latent image on a photosensitive body via the collimator lens, rotary polygonal mirror, lens and the like, and that the latent image is transferred onto a recording sheet and developed.

Thereafter at S217, it is checked whether the whole surface of the original has been scanned. If it is not still completed, the flow returns to S215 to resume scanning and recording the original surface. If it is completed, the flow advances from S217 to S218 to check whether the specified number of sheets has been copied. If it is still not completed, the flow again returns to S215 to scan the original for a next page. After completion of the specified number of sheets, the flow returns to S207.

If S220 follows upon request for an input/output in an on-line mode at S202, MPU 1 checks whether the request is a transmission request, i.e., a request to read an original set on the image information input device 7 and transmit the readout original to another information processing device. If the request is not a transmission request but an output request to the image information output device 6, then the flow advances to S221. If it is a transmission request, then the flow advances to S250.

At S221, MPU 1 makes the original size and the number of sheets, sent from another information processing device to the information processing device 12 of now concern, to be stored via the line interface 11 and bus switch 9 in the memory 2. Next, at S222 the succeeding transmitted image information is received. The received image information is expanded, if necessary, at the compression/expansion unit 10 to store it in the memory 4. Or if not necessary, the image information is directly transferred and stored in the image memory 4 via the bus switch 9.

At S223, whether one frame data has been normally received via the line interface 11 is checked. If it is normal, at S224, an affirmation response (ACK) is transmitted and thereafter at S225 it is checked whether a "copy" key input has been entered. If there is not "copy" key input, then S233 follows. Alternatively, if there is a "copy" key input, then the flow advances to S226 to instruct the input/output control unit 5 to set an "OFF" flag and flash the on-line key. MPU 1 instructs the input/output control unit 5 to make the image information input device 7 activate and read the size of an original set on the original glass 23. Thereafter, the flow advances to S233.

Upon reception of a command from MPU 1 to read the original size, the input/output control unit 5 by itself executes the original size readout processing. This processing can be performed concurrently with the image information output operation by the image information output device 6.

At S228 and S229 similar to S210 and S211 in an off-line processing, the input/output control unit 5 reads the original size from the image information input device 7 to store it in the memory 2. Next, at S230, an "END" flag is set to complete the processing and wait for another instruction.

In case image data is not normally received at S223 and some reception error is present, then the flow advances to S231 to transmit a negation response to the information processing device 12 via the line interface 11, the negation response serving as a request to send the image data once again. The flow returns to S201 to wait for re-transmission of the image data.

If S233 is used after S225 or S227, image information is outputted from the image information output device 6 at the following steps including S233, the image information having been received in an on-line mode from another information processing device.

First at S233, the input/output control unit 5 activates the image information output device 6 under control of MPU 1, and a recording sheet size corresponding to the designated original size is selected. Next at S234, the input/output control unit 5 sequentially reads image information stored in the image memory 4 to transfer it to the image information output device 6 and print it out at S235. Thereafter at S236, it is checked whether printing of a designated number of sheets has been completed. If not, the flow advances to S237 to check an "copy" key input has been entered. If not, the flow returns to S234. If affirmative, the flow advances to S238. At S238, the input/output control unit 5 is instructed to set an "OFF" flag and flash the on-line key. At S239 similar to S227, the input/output control unit 5 is instructed to read the original size from the image information input device 7. Thus, the input/output control unit 5 executes the processings as in S228 to S230.

As the print-out to the image information output device 6 sequentially progresses and a designated number of sheets is completely printed out, the flow advances to S241 from S236 to check whether an "OFF" flag is set. If not, the flow returns to S201 to wait for a next image information input in an on-line mode.

In case an "OFF" flag is set, it means that a "copy" key input has been entered during an on-line processing and that the input/output control unit 5 has been instructed to execute reading the size of an original placed on the original glass 23 of the image information input device 7. Consequently, at S242 it is checked whether an "END" flag is set. This is to wait for the end of the readout of the original size by the input/output control unit 5. In case an "END" flag is set at S242, the flow advances to S243 to reset the "END" flag and return to S205 for execution of an off-line mode.

If the processing request in an on-line mode at S220 is a transmission request, i.e., a request to read image information from the image information input device 7 and transmit it to another information processing device, then S220 advances to S250. At S250, MPU 1 activates the image information input device 7 via the input/output control unit 5. At S251, the original size of an original set on the original reading surface of the device 7 is read and the read-out size data is stored in the memory 2. Next, at S252, it is checked whether an original has been placed on the reading surface. If an original is not placed on the surface, an error processing at S260 is carried out to conduct an error procedure such as instructing the operator to place an original.

If it is confirmed that an original has been placed, the flow advances to S253 from S252. At S253 the image information input device 7 reads image information from the original and sequentially store it in the image memory 4. Upon completion of the storage, the flow advances to S254. At S254, to call a destination information processing device to which image information is to be transmitted, the information processing device 1 is notified of the fact that image information transmission has been fully prepared. Next, at S255, a response from the information processing device 12 is received to check the response as to transmittability. If it is not transmittable to the destination information processing device, an error processing a S260 is carried out to thereby notify the operator of an untransmittable state.

In case of a transmittable state at S255, information on an original size and the designated number of sheets are first read out from the memory 2. Then, the read-out information is transferred to the information processing device 12 via the bus switch 9 and line interface 11. Succeedingly, the image information previously read at S253 is read out from the image memory 4, subjected to a compression processing at the compression/expansion unit 10, and transferred to the information processing device 12 via the line interface 11. Thereafter, it is checked whether the image information has been normally transferred and an affirmation response has been given. In case of an affirmation response, the transmission processing is terminated to return to S201. In case of a negation response and if a transmission is requested once again, then the flow returns to S256 to again transmit image information and other necessary information.

According to the present embodiment described above, even during executing in an on-line mode a processing based on a print-out request from the image information processing device 6 in association with another information processing device, it is possible upon request of a copy operation to activate the image information input device 7 without interrupting the printing processing and execute pre-scanning for preliminarily reading the size of an original set on the input device 7. Therefore, the copy operation on an off-line mode can immediately be performed after the end of the on-line processing.

As described above, since preliminary processings necessary for the copy operation in an off-line mode can be performed even during executing an on-line processing, an image information processing system can be presented which completes the copy operation in a short time.

Various preliminary processings other than automatic recognition of the original size are possible prior to the end of an on-line processing, such as threshold setting operation for quantamizing read-out image information, setting operation of the exposure light amount to an original, or compensation operation for irregularity of signals.

Although the preferred embodiments of this invention have been described in the foregoing, it is to be understood that the present invention is not limited thereto but various modifications and changes are possible within the scope of the following claims.

What is claimed is:

1. An image information processing system comprising:
   a bus line on which data including image data are transferred;
   reading means fer reading an original image and generating image data;
   recording means for recording an image in accordance with image data;
   input/output control means, connected to said reading means, said recording means and said bus line, for controlling image data transmission therebetween;
   receiving means, connected to said bus line, for receiving image data from an external apparatus and supplying received image data to said bus line; and
   storage means, connected to said bus line, for storing image data;
   wherein, during recording of the image by said recording means based on the image data generated by said reading means, said image data received by said receiving means is transferred via said bus line to be stored in said storage means.

2. An image information processing system according to claim 1, wherein said recording means operates to record the image, after completion of the image recording based on the image data from said reading means in execution, in accordance with the image data stored in said storage means.

3. An image information processing system according to claim 1, further comprising control means for controlling the operation of said system, wherein said control means delivers an operation command via said bus line.

4. An image information processing system comprising:
   reading means for reading an original image and generating image data;
   recording means for recording an image in accordance with image data;
   receiving means for receiving image data from an external apparatus; and
   control means for controlling operation of said system;
   wherein, during recording of said image by said recording means based on said image data received by said receiving means, if there is a request for image recording by said recording means based on the image data from said reading means, said control means retains said request and causes said recording menas to perform the image recording based on the image data from said reading means, in accordance with the retained request, after completion of the image recording based on the image data received by said receiving means inexecution.

5. An image information processing means according to claim 4, further comprising storage means for storing the image data received by said receiving means, wherein said recording means records the image based on the image data read out from said storage means.

6. An image information processing system comprising:
   reading means for reading an original image and generating image data;
   recording means for recording an image in accordance with image data;
   receiving means for receiving image data from an external apparatus; and
   control means for controlling operation of said system;
   wherein, during a plurality of image recordings by said recording means based on the image data generated by said reading means, if there is a request for image recording by said recording means based on the image data received by said receiving means, said control means performs the control operation in first and second modes, wherein in the first mode, said control means causes said recording means to perform the image recording based on the image data received by said receiving means after completion of the plurality of number of image recordings in execution, and in the second mode, said control means causes said recording means to perform the image recording based on the image data received by said receiving means before completion of the plurality of image recordings in execution.

7. An image information processing system according to claim 6, further comprising storage means for storing the image data received by said receiving means, wherein said recording means records the image based on the image data stored in said storage means.

8. An image information processing system comprising:
   reading means for reading an original image and generating image data;
   recording means for recording an image in accordance with image data;
   receiving means for receiving image data from an external apparatus; and
   control means for controlling operation of said system;
   wherein, during recording of the image by said recording means based on the image data received by said receiving means, if there is a request for image recording by said recording means based on the image data from said reading means, said control means enables an image recording condition based on said image data from said reading means to be set during recording of the image based on the image data received by said receiving means.

9. An image information processing system according to claim 8, wherein said condition is information on an original size.

10. An image information processing system according to claim 8, wherein the image recording based on the image data from said reading means is carried out after completion of the image recording in execution.

11. An image information processing system comprising:
    reading means for reading an original image and generating image data;
    recording means for recording an image in accordance with image data;
    communication means for transmission and reception image data over an external apparatus;
    storage means for storing image data; and
    control means for controlling operation of said system;
    wherein said image data received by said communication means or said image data from said reading means is stored in said storage means and thereafter transferred to said recording means or said communication means, and in the case of a malfunction of said reading means or said recording means during execution of the processing using said storing means, said control means permits said storage means to be used for another processing.

12. An image information processing system according to claim 11, wherein said storage means is capable of storing a page of said image data.

13. An image information processing system according to claim 11, wherein said communication means is operable to transmit the image data upon compression thereof and to expand compressed image data received by said communication means.

14. An image information processing system according to claim 11, wherein, in the case of a malfunction of said reading means or said reading means, said control means permits said storage means to be used for another processing which is not involved in the malfunction.

15. An image information processing system according to claim 11, wherein said reading means, said recording means, said communication means, said storage means and said control means are connected with a bus line.

16. An image information processing system according to claim 1, wherein the image data generated by said reading means is transferred to said recording means without passing through said bus line.

17. An image information processing system according to claim 1, wherein said storage means is capable of storing a page of image data.

18. An image information processing system according to claim 4, wherein said receiving means is operable to expand the received compressed image data.

19. An image information processing system according to claim 4, wherein said control means enables the image recording condition based on the image data from said reading means to be set before completion of the image recording based on the image data received by said receiving means.

20. An image information processing system according to claim 4, wherein said reading means, said recording means, said receiving means and said control means are connected with a bus line.

21. An image information processing system according to claim 7, wherein said storage means stores the image data received by said receiving means, during the image recordings based on the image data generated by said reading means.

22. An image information processing system according to claim 6, wherein said receiving means is operable to expand the received compressed image data.

23. An image information processing system according to claim 6, wherein said reading means, said recording means, said receiving means and said control means are connected with a bus line.

24. An image information processing system according to claim 8, further comprising storage means for storing the image data received by said receiving means and supplying stored image data to said recording means.

25. An image information processing system according to claim 8, wherein said receiving means is operable to expand the received compressed image data.

26. An image information processing system according to claim 8, wherein said reading means, said recording means, said receiving means and said control means are connected with a bus line.

* * * * *

UNITED STATES PATENT AND TRADEMARK OFFICE
CERTIFICATE OF CORRECTION

PATENT NO. : 4,727,435

DATED : February 23, 1988

INVENTOR(S) : MASATOSHI OTANI, ET AL.

It is certified that error appears in the above-identified patent and that said Letters Patent is hereby corrected as shown below:

COLUMN 1

Line 68, "a" should be deleted.

COLUMN 2

Line 58, "a" should read --an--.

COLUMN 4

Line 21, "are" (first occurrence) should be deleted.
Lines 24-25, "execretion" should read --execution--.
Line 28, "information." should read --information--.
Line 44, "storrng" should read --storing--.
Line 45, "rmage" should read --image--.
Line 47, "t" should read --to--.
Line 50, "5" should be deleted.
Line 52, "to store" should read --to thereby store--.
Line 58, "follow" should read --follows--.
Line 65, "case the" should read --the case--.

COLUMN 5

Line 5, "20" should be deleted.
Line 32, "host" should read --a host--.
Line 54, "non-compressdd" should read --non-compressed--.
Line 59, "deVice" should read --device--.

UNITED STATES PATENT AND TRADEMARK OFFICE
CERTIFICATE OF CORRECTION

PATENT NO. : 4,727,435

DATED : February 23, 1988

INVENTOR(S) : MASATOSHI OTANI, ET AL.

It is certified that error appears in the above-identified patent and that said Letters Patent is hereby corrected as shown below:

COLUMN 6

Line 30, "noticed" should be deleted.
Line 39, "input/ output" should read --input/output--.
Line 40, "hands," should read --hand,--.
Line 57, "input/ output" should read --input/ output--.

COLUMN 7

Line 27, "of on-" should read --of several possible on---.
Line 37, "hands," should read --hand,--.
Line 54, "case" should read --the case--.
Line 58, "case" should read --the case--.
Line 67, "on line" should read --on-line--.

COLUMN 8

Line 4, "to the" should read --to change from an on-line mode to an off-line mode. Therefore, the--.
Line 13, "checkd" should read --checked--.
Line 21, "hands," should read --hand,--.
Line 38, "a" should read --an--.
Line 51, "Or if" should read --Or, if that is--.

COLUMN 9

Line 24, "hands" should read --hand--.
Line 42, "check" should read --check whether--.
Line 43, "a" should read --an--.
Line 46, "hands," should read --hand,--.

UNITED STATES PATENT AND TRADEMARK OFFICE
CERTIFICATE OF CORRECTION

PATENT NO. : 4,727,435

DATED : February 23, 1988

INVENTOR(S) : MASATOSHI OTANI, ET AL.

It is certified that error appears in the above-identified patent and that said Letters Patent is hereby corrected as shown below:

COLUMN 10

Line 41, "S54 to" should read --S54, to--.
Line 64, "case" should read --the case--.
Line 65, "case" should read --the case--.

COLUMN 11

Line 53, "which is unnecessary to always" should read --in which it is unnecessary always to--.
Line 64, "an original setting" should read --setting an original--.

COLUMN 12

Line 1, "processing," should read --processing--.
Line 21, "one of" should read --one of several possible--.
Line 31, "hands," should read --hand,--.

COLUMN 13

Line 9, "arrow direction" should read --direction of the arrow--.
Line 29, "select" should read --selected--.
Line 46, "not still" should read --still not--.
Line 54, "request." should read --a request--.

UNITED STATES PATENT AND TRADEMARK OFFICE
CERTIFICATE OF CORRECTION

PATENT NO. : 4,727,435

DATED : February 23, 1988

INVENTOR(S) : MASATOSHI OTANI, ET AL.

It is certified that error appears in the above-identified patent and that said Letters Patent is hereby corrected as shown below:

COLUMN 14

```
Line 3, "Or if" should read --Or, if that is--.
Line 10, "not" should read --no--.
Line 52, "check an" should read --check whether an--.
Line 67, "In case" should read --In the case that--.
```

COLUMN 15

```
Line 7, "In case" should read --In the case that--.
Line 27, "store" should read --stores--.
Line 39, "In case" should read --In the case--.
```

COLUMN 16

```
Line 10, "quantamizing" should read --quantizing--.
Line 24, "fer" should read --for--.
Line 68, "menas" should read --means--.
```

COLUMN 17

```
Line 4, "inexecu-" should read --in execu---.
```

UNITED STATES PATENT AND TRADEMARK OFFICE
CERTIFICATE OF CORRECTION

PATENT NO. : 4,727,435

DATED : February 23, 1988

INVENTOR(S) : MASATOSHI OTANI, ET AL.

It is certified that error appears in the above-identified patent and that said Letters Patent is hereby corrected as shown below:

<u>COLUMN 18</u>

Line 8, "image" should read --of image--.
    Line 18, "storing" should read --storage--.
    Line 31, "reading" (second occurrence) should read --recording--.

Signed and Sealed this

Eighteenth Day of October, 1988

Attest:

DONALD J. QUIGG

Attesting Officer      Commissioner of Patents and Trademarks